Dec. 4, 1956  H. F. TOMASEK  2,772,511
DEVICE FOR KILLING INSECTS
Filed April 19, 1955  2 Sheets-Sheet 1

INVENTOR
HERBERT F. TOMASEK

BY
Cushman, Darby & Cushman
ATTORNEYS

Dec. 4, 1956     H. F. TOMASEK     2,772,511
DEVICE FOR KILLING INSECTS

Filed April 19, 1955     2 Sheets—Sheet 2

INVENTOR
HERBERT F. TOMASEK

BY *Cushman, Darby & Cushman*
ATTORNEYS

United States Patent Office 2,772,511
Patented Dec. 4, 1956

2,772,511

DEVICE FOR KILLING INSECTS

Herbert F. Tomasek, Pittsburgh, Pa., assignor to Pittsburgh Coke & Chemical Company, Pittsburgh, Pa., a corporation of Pennsylvania Application April 19, 1955, Serial No. 502,363

10 Claims. (Cl. 43—131)

This invention relates to devices for destroying insects and more particularly to an improved insect killing device of the type employing an insecticidal composition especially useful in killing flies.

An object of the present invention is to provide an insect killing device including improved means for exposing an insecticide to insects.

Another object of the present invention is the provision of an insect killing device of the type described including improved means for supplying the insecticide exposing means with insecticide.

A still further object of the present invention is the provision of a novel insect killing device which includes a receptacle for containing a liquid insecticide and means providing insecticide retaining surfaces movable between an operative insecticide exposing position supported by the receptacle and an inoperative insecticide receiving position within the receptacle.

Still another object of the present invention is the provision of a device of the type described which is simple in construction, easy to operate and economical to produce.

These and other objects of the present invention will become more apparent during the course of the following detailed description and appended claims.

The invention may best be understood with reference to the accompanying drawings wherein an illustrative embodiment is shown.

Referring now more particularly to the drawings, there is shown an insect killing device, generally indicated at 10, which embodies the principles of the present invention. The device 10 includes a generally cup-shaped receptacle 12 for containing a supply of insecticidal composition preferably in liquid form. The receptacle may be of any suitable shape or size and may be made of any suitable material such as glass, metal or plastic, a preferable material being polystyrene. Any suitable insecticidal composition may be employed, for example, DDT dissolved or emulsified in a suitable solvent, such as water, with a suitable insect-food attractant, such as sugar, included therein.

Figure 1:
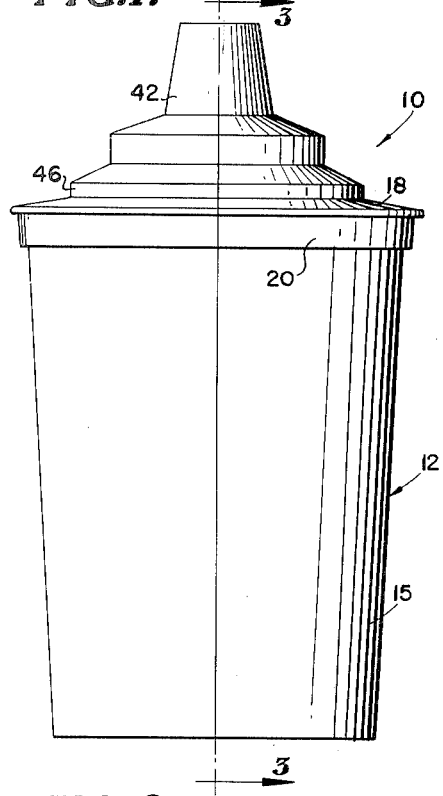
Figure 1 is a front elevational view of an insect killing device embodying the principles of the present invention showing the same in its inoperative or storage position.
Figure 3:
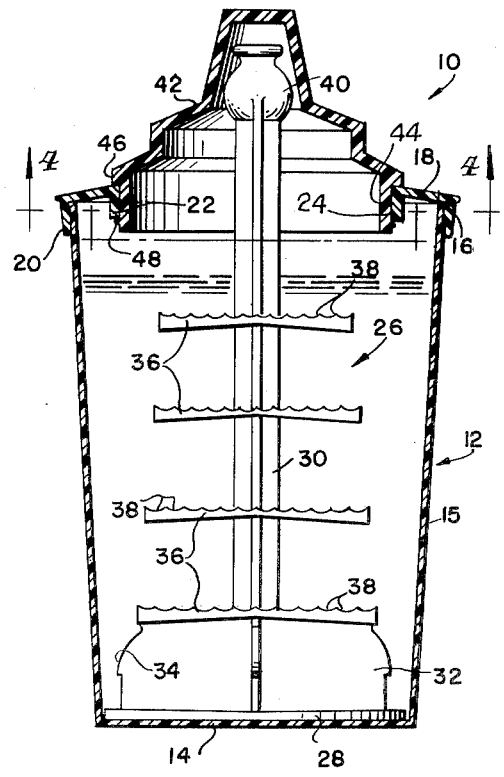
Figure 3 is a cross-sectional view taken along the line 3—3 of Figure 1.
Figure 2:
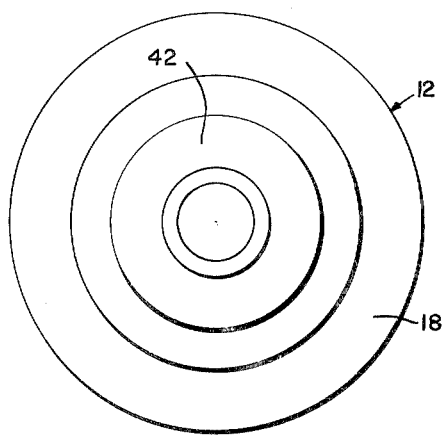
Figure 2 is a top plan view of the device of Figure 1.
Figure 4:
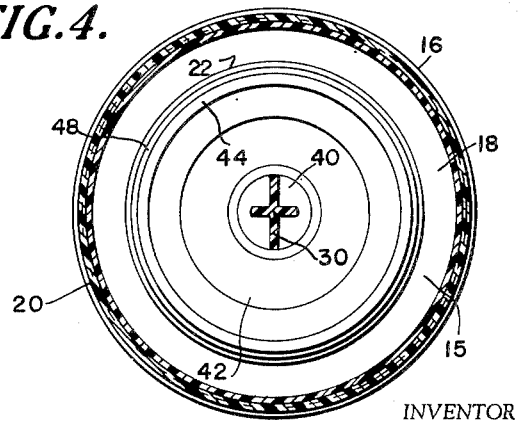
Figure 4 is a cross-sectional view taken along the line 4—4 of Figure 3.

As shown in Figures 1–3, the receptacle 12 includes a bottom wall 14 and an upwardly extending annular wall 15 having an outwardly flared annular bead 16 disposed on the upper edge thereof. An annular lid element 18 is secured to the upper edge of the receptacle and includes an outer depending flange 20 arranged to engage the annular bead 16 so as to secure the lid element 18 on the receptacle in sealed engagement. The lid element 18 also includes an inner annular flange 22 defining a central opening 24 in the top of the receptacle. The lid element 18 may be made of any suitable material, such as rubber, plastic or the like, a preferable material being polyethylene.

Disposed within the receptacle is a pylon or tree member 26, which functions to retain the insecticide and expose the same to the insects. The member 26 may be made of any relatively rigid material, such as glass, metal or plastic, a preferable material being polystyrene. Moreover, it is preferable that the tree member be black in color since it has been found that this color is more attractive to the ordinary house fly for which the present invention is particularly useful. The member 26 comprises a substantially flat circular base 28 having a central stem 30 extending upwardly therefrom. A plurality of radially extending ribs 32 extend upwardly from the base 28 and have their inner edges integrally attached to the stem 30. The outer edges of the ribs 32 are curved as at 34, to provide cam surfaces for a purpose to be hereinafter more fully described. Mounted on the stem 30 above the ribs 32 is a plurality of vertically spaced horizontally extending platforms 36. These platforms are preferably progressively diminishing in size from the bottom of the stem to the top thereof so as to permit easier access by the insects to all the platforms. The upper surface of each of the platforms 36 is provided with a plurality of parallel grooves 38 suitable to retain a small amount of the liquid insecticidal composition. The upper end of the stem 30 includes a knob 40 by which the tree member may be conveniently manipulated.

A cover or lid member 42 which may also be of polyethylene is provided for the receptacle and includes a depending annular flange 44 arranged to seat within the opening 24 provided by the inner flange 22 of the lid element 18. Extending radially outwardly from the upper end of the flange 44 is an annular flange 46 adapted to seat on the upper surface of the lid element 18 adjacent the opening 24. The lower edge of the flange 44 is provided with an annular bead 48 adapted to engage the lower edge of flange 22 when the cover 42 is in its receptacle closing position, such as shown in Figure 3.

The device of the present invention operates as follows. As shown in Figure 3, the receptacle 12 is adapted to contain a liquid insecticidal composition which may substantially fill the receptacle. The tree member 26, when not in use, is adapted to be disposed in an inoperative insecticide receiving position, such as shown in Figure 3 wherein the base 28 rests upon the receptacle bottom 14 and the platforms 36 are immersed within the insecticidal composition. It will be noted that the diameter of the base 28 is greater than the diameter of the opening 24 and hence, it is first necessary to remove the lid element 18 before insertion of the tree member within the receptacle. After the pylon or tree member has been placed within the receptacle, the outer flange 20 of the lid element 18 may be engaged in sealing relation to the upper edge of bead 16 of the receptacle. When the device is not in use, the cover 42 may be engaged within the opening 24 to provide a sealed container for the insecticidal composition and pylon or tree member. The cover 42 remains in sealed engagement by virtue of the engagement of flanges 44 and 46 and bead 48 with flange 22.

When it is desired to use the device of the present invention, cover 42 is first removed to expose the upper knob 40 of the pylon or tree member 26. It will be noted that knob 40 is disposed above the opening 24 so as to be easily grasped by the user and so that the same will be free from contact with the insecticidal composition within the receptacle. Cover 42 is suitably shaped to enclose the knob 40 when engaged within the opening 24. Next, the user lifts the tree member 26 upwardly by the knob 40 thus removing the platforms from the insecticidal composition permitting the latter to drip downwardly as the tree is raised. In this regard, it will be noted that the progressive diminishing size of the platforms enables the insecticide to drip progressively from one platform to another so as to reduce splashing thereof.

Figure 5:
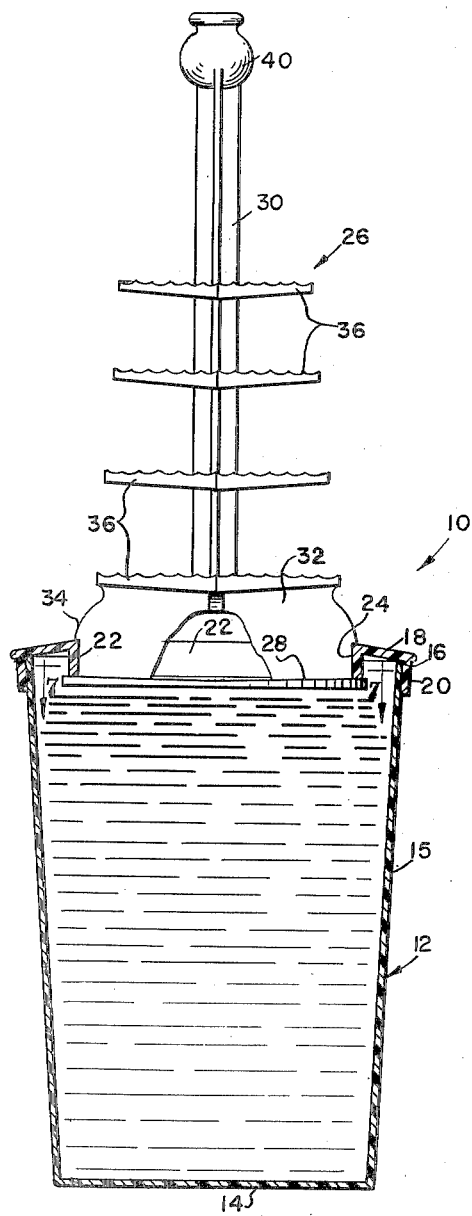
Figure 5 is a front elevational view of the device in its operative position.
Figure 6:
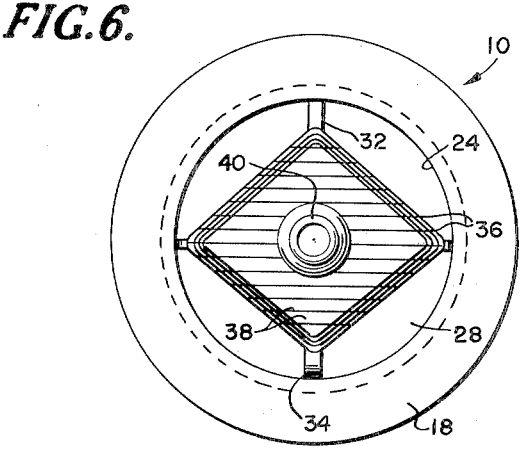
Figure 6 is a top plan view of the device in its operative position.
Figure 7:
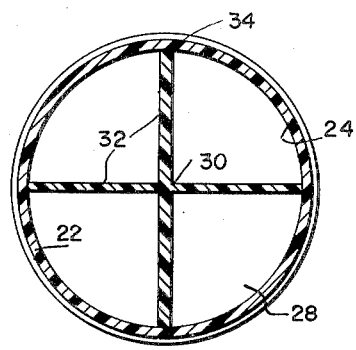
Figure 7 is a cross-sectional view taken along the line 7—7 of Figure 5.

The tree member 26 is adapted to be supported by the receptacle in an operative insecticide exposing position wherein the outer curved surfaces 34 of the ribs 32 are engaged within the opening 24 defined by the inner flange 22 with the slight curved projections of the surfaces 34 engaging the top edge of the flange. This engagement is sufficient to maintain the tree member 26 in its operative position, such as shown in Figure 5, and it will be noted that the upper surface of base 28 is in substantial engagement with the lower edge of the annular flange 22. In this manner, the insecticidal composition within receptacle 12 is substantially sealed from the atmosphere during use so as to reduce the effect of evaporation. Furthermore, the upper surface of the base defines the bottom of an insecticidal composition drip receiving reservoir, the upper portion of which is defined by the inner surface of annular flange 22. It can thus be seen that as the tree member 26 is moved into its operative position, any insecticide which drips from the platforms 36 will be caught in the reservoir, thereby providing a convenient means to take care of the excess insecticidal composition. In addition, the base 28 may be formed with its upper surface slightly angular so that a complete liquid-tight seal with the flange 22 is not provided. In this manner, the insecticide collected within the reservoir may pass into the receptacle but yet, a substantial seal from the atmosphere is provided.

The present invention also contemplates the provision of a non-food insect attractant which may be pyridine or a salt thereof, preferably pyridine hydrochloride. This attractant may be utilized in any form, which may be placed anywhere within close proximity of the device. It has been found that pyridine and its salts are highly satisfactory as insect attractants and are particularly effective with the common house fly. With the use of pyridine or its salts, the present invention contemplates a novel method of killing insects wherein pyridine or a salt thereof, preferably in aqueous solution, placed in close proximity to the insecticide acts to attract the flies or other insects to the insecticide which kills the same.

It is to be understood that the form of the invention herewith shown and described is to be taken as the preferred embodiment of the same and that various changes may be made without departing from the spirit of the invention or the scope of the appended claims.

I claim:

1. A device for killing insects comprising a receptacle for containing liquid insecticidal composition and rigid means forming a plurality of vertically spaced horizontal generally planar surfaces for retaining the liquid insecticidal composition for exposure to insects, said means being movable between an inoperative, insecticide receiving position wherein the same is disposed within said receptacle for immersion within the insecticidal composition contained therein and an operative insecticide exposing position wherein said means is supported by said receptacle above the top of the latter.

2. A device for killing insects comprising: a receptacle for containing liquid insecticidal composition, said receptacle having an opening in its top; and a rigid member having a base and a plurality of vertically spaced horizontal surfaces above said base for retaining the liquid insecticide for exposure to insects, said member being movable between an inoperative insecticide receiving position wherein said member is disposed within said receptacle with said base in engagement with the bottom of said receptacle and said surfaces immersed in the liquid insecticidal composition contained therein and an operative insecticide exposing position wherein said member is supported by said receptacle with said base in substantial sealing engagement with the opening in the top of said receptacle and said surfaces exposed thereabove.

3. A device as defined in claim 2 wherein said receptacle includes a cover for entering the opening in the top of said receptacle so as to enclose said member when the latter is in its inoperative insecticide receiving position.

4. A device as defined in claim 2 wherein the opening in the top of said receptacle is provided by a separate annular element secured to the top edge of said receptacle.

5. A device as defined in claim 4 wherein the top edge of said receptacle includes an annular bead and wherein said annular element includes a depending flange engageable with said bead for securing said element to said receptacle.

6. A device as defined in claim 2 wherein the opening in the top of said receptacle is defined by an annular surface of substantial height and wherein said base engages the lower end of said annular surface when said member is in its operative insecticide exposing position so as to form an insecticide drip collecting reservoir above said base within said annular surface.

7. A device as defined in claim 2 wherein said member includes ribs extending upwardly from said base, and said ribs having outer cam surfaces for engagement within said opening so as to secure said member in its operative insecticide exposing position.

8. A device as defined in claim 2 wherein said member includes a central stem extending upwardly from said base and a plurality of vertically spaced horizontal platforms on said stem, and said platforms providing said insecticide retaining surfaces.

9. A device as defined in claim 8 wherein said platforms progressively diminish in size upwardly from said base.

10. A device as defined in claim 8 wherein said insecticide retaining surfaces comprise parallel grooves extending across the upper horizontal surfaces of said platforms.

References Cited in the file of this patent

UNITED STATES PATENTS

| | | |
|---|---|---|
| 925,616 | Weinfeld | June 22, 1909 |
| 1,286,763 | Pfeiffer | Dec. 3, 1918 |
| 1,513,138 | Tarnok | Oct. 28, 1924 |
| 1,845,977 | Fuller | Feb. 16, 1932 |
| 1,902,723 | Roberts | Mar. 21, 1933 |
| 2,101,988 | Epstein | Dec. 14, 1937 |
| 2,176,345 | Hurwitt | Oct. 17, 1939 |
| 2,547,314 | Grant | Apr. 3, 1951 |
| 2,573,672 | Reinhardt | Oct. 30, 1951 |
| 2,609,230 | Raleigh | Sept. 2, 1952 |

FOREIGN PATENTS

| | | |
|---|---|---|
| 87,157 | Austria | Jan. 25, 1922 |
| 212,483 | Germany | Aug. 4, 1909 |
| 262,381 | Germany | July 11, 1913 |
| 470,612 | Italy | Apr. 16, 1952 |
| 650,267 | Great Britain | Feb. 21, 1951 |
| 685,259 | Germany | Dec. 14, 1939 |

OTHER REFERENCES

Chemical Insect Attractants and Repellants by Dethier, published by The Blackiston Co. 1947, pgs. 96 and 213.